Reissued Sept. 14, 1954 Re. 23,866

UNITED STATES PATENT OFFICE 23,866

COMPOSITIONS CONTAINING ESTERS OF A GLYCOL AND POLYCARBOXYLIC ACIDS AND THE TREATMENT OF CELLULOSE THEREWITH

Walter P. Ericks, Lockport, N. Y., assignor to The Upson Company, Lockport, N. Y., a corporation of New York No Drawing. Original No. 2,629,701, dated February 24, 1953, Serial No. 95,872, May 27, 1949. Application for reissue January 14, 1954, Serial No. 404,154

18 Claims. (Cl. 260—29.3)

Matter enclosed in heavy brackets [ ] appears in the original patent but forms no part of this reissue specification; matter printed in italics indicates the additions made by reissue.

This invention relates to dimensionally stabilized materials of cellulose fibers, particularly cellulose structural materials, and to methods for stabilizing such materials against dimensional change caused by change in the humidity of the environment surrounding such cellulose materials. More particularly, the invention relates to the stabilization of structural cellulose fiber boards as well as wood, paper and fabrics made of cotton, linen, and other cellulose materials, to render them more resistant to dimensional changes resulting from variations in the ambient humidity and to improve the strength of such products.

It is well known that materials made up entirely or predominantly of cellulose fibers expand and contract with variations in humidity in the ambient atmosphere, such materials suffering an increase in their dimension upon absorption of moisture from the atmosphere and a contraction when moisture is given up to the atmosphere upon a decrease in the humidity thereof. It is also well known that in articles wherein fibers are directionally oriented, such expansion and contraction usually occurs to the greatest extent in a direction perpendicular to the predominant direction of the fibers. The present invention is, therefore, adapted particularly in preventing or minimizing the dimensional change which occurs across the fibers with change in humidity in cellulose materials, although it also reduces dimensional change in the direction of the fibers with humidity change.

Various expedients have been heretofore employed for the purpose of dimensionally stabilizing materials made up predominantly of cellulose fibers as, for instance, plywood, wood boards, pulp products and combinations thereof, and solid paper boards. A degree of dimensional stabilization is obtained in the manufacture of plied or laminated articles by arranging the laminations with their fiber directions disposed angularly to one another rather than parallel. Although improvement in dimensional stabilization is obtained, the operation is laborious since it requires cutting and proper selection and assemblage of the plies.

It has also been suggested to densify the products under heavy pressure and to thereby set the cellulose fibers. Very expensive presses and extensive auxiliary equipment is required for this operation, and the product lacks low density and some of the flexibility desired for many uses of structural cellulose fiber board.

In accordance with the present invention, I have found that materials made up predominantly of cellulose fibers may be wholly or partially stabilized against dimensional change by introducing into such cellulose materials certain specified chemical compounds which appear to have a particular affinity for the cellulose fibers. Compounds which produce dimensional stabilization are organic in nature and have at least two hydroxyl groups, at least one of which is a part of a carboxyl group, and possess certain other characteristics with respect to volatility. Thus, the partial esters of polycarboxylic acids and polyhydric alcohols having at least one hydroxyl group in the residue derived from the polyhydric alcohol and at least one carboxyl group in the residue derived from the polycarboxylic acid have exceptional stabilizing action upon the structures made up of cellulose fibers. In the compounds contemplated, the second hydroxyl group may be that forming part of the unreacted carboxyl group of the acid residue. In some instances, the hydroxyl of the carboxyl group may be esterified with low molecular weight alcohol. The resultant products may be liquid to solid. In general, the low molecular weight liquid products are soluble in water. The medium molecular weight materials and the high molecular weight materials are soluble in hydrophilic organic solvents such as alcohols or ketones or mixtures of these solvents. The liquid partial esters and the higher members, when in solution in water or hydrophilic solvent, rapidly penetrate into the fibrous structure of the cellulose material to be dimensionally stabilized in any desired quantity or amount. Further properties and characteristics of the stabilizing chemicals will be more fully described hereinafter.

For purposes of illustration only, the invention will be described in detail in its application to the production of dimensional stability in laminated structural cellulose fiber boards. Such products are best exemplified upon the market by the structural building panels sold under the name "Upson Board." These cellulose fiber boards are generally manufactured from so-called fiber boards, that is, a fiber sheet with a caliper greater than about 0.030 inch. These fiber boards are assembled and bonded to one another to produce a laminated or plied article having, for instance, from two to about seven plies. The resulting laminated structural cellulose fiber board occurs in standard sized panels of from ⅛ inch to ⅜ inch or more in thickness, and of specified length and widths. The original cellulose board is manufactured from any conventional type of cellulose pulp stock as, for instance, ground wood fiber, chemical wood fiber, rag fiber and other conventional pulp fibers and mixtures thereof. The initial cellulose board which constitutes the individual ply may be made either upon a conventional cylinder machine, as is generally the case, or may be made upon a Fourdrinier machine. It will be understood, however, that the invention is of general application to structural cellulose materials as, for instance, fiber insulation board, sound absorbing board, table top board, structural board for the interior of an airplane, and the like.

The compounds employed to effect stabilization in the structural cellulose fiber board against dimensional change induced by change in humidity may be introduced into the fibers from which the board is made, into the individual plies of the ultimate laminated structure or into the final laminated assembly itself. The choice of the place of introduction of the stabilizing compound and the manner in which it is to be introduced will be dictated by the type of fiber available and the type of structural panel to be produced.

Thus, when operating a closed board machine system wherein all water is recycled, the impregnating compound may be added to the beater or to the stock prior to paper formation, as for instance in the head chest, assuming that a stabilizing compound has been chosen which is not readily subject to hydrolysis at the temperature and pH of the pulp suspension. Or, the impregnating compound may be added at any other point in the wet end of the machine.

Where the individual cellulose structural board is already formed, the stabilizing compounds may be introduced into the board by immersing the board in the compound or a solution thereof or by impregnating the board with a spray containing the treating compound or by applying it with padding rolls, all conventional methods of impregnation. Where a laminated board has already been formed by bonding a plurality of individual boards together, the resultant laminated article may be immersed in the stabilizing compounds or a solution thereof and the impregnated board subsequently dried. The impregnation under such circumstances will generally be desirably performed by subjecting the board to vacuum, at which time occluded gases and volatile materials are removed from the board, then permitting the impregnating solution to flow into the evacuated chamber containing the board generally placed therein in an upright position and spaced apart, whereby the boards are enveloped in the solution which is, in effect, forced into the boards. This penetration of the solution may then be increased by relieving the vacuum and, if desired, raising the pressure above that of the atmosphere to enhance the speed and depth of penetration.

It is therefore an object of the present invention to provide a simple and inexpensive impregnating method for dimensionally stabilizing and strengthening structures made up substantially of cellulose and to produce dimensionally stabilized cellulose products.

In broad aspect, therefore, the invention comprehends the incorporation into structural cellulose fibrous materials of partial esters of polycarboxylic acids and polyhydric alcohols whereby the usual expansion and contraction of such cellulose materials is considerably minimized by reason of change in humidity conditions in the atmosphere surrounding such materials. This stabilizing effect is dependent upon the quantity of the stabilizing compound incorporated in the fibrous cellulose structural element. Effective dimensional stabilization has been accomplished by incorporating in the fibrous material an amount of stabilizing compound constituting from about 2 to 50% of the weight of the impregnated product based upon the weight of oven dried fiber. The exact quantity to be incorporated into the cellulose material will be dictated by the type of material, the type of partial ester employed as a stabilizing compound, and the amount of the usual expansion or contraction which it is desired to remove. Thus, under certain conditions of use, the removal of so little as 12 or 15% of the normal expansion or contraction of a cellulose structural material may be suitable, while in other conditions of use, it may be desired to remove 50, 60 or 70% or more of the normal expansion or contraction encountered with a particular change in humidity conditions in the surrounding atmosphere.

The stabilizing compound may consist of a single partial ester, a single partial mixed ester or a mixtur of partial esters. Under some circumstances, the stabilizing compounds may be incorporated into the cellulose fibers, whether the same be in fibrous form, unfibrated or felted fibrous form, by the employement of aqueous solutions, solutions in hydrophilic solvents, or mixtures thereof with water or in some instances may be incorporated without the employment of a solvent. However, the usual mode of incorporation will be to employ as an impregnating solution an aqueous or hydrophilic solution of the stabilizing compound.

The cellulose structural materials may be treated with the impregnated stabilizing material or solution thereof at substantially any desired temperature, although the usual impregnating temperatures will range between 20° C. and 50° C. However, temperatures as high as 100° C. may frequently be employed.

While the actual mechanism of the stabilizing action of the present invention for cellulose fibers is not fully understood, it is believed that their penetrating power and their fixation on and in the cellulose fibers is due to the particular molecular structure, that is to say, the presence of hydroxyl groups in both the cellulose and the stabilizing material.

After their incorporation in the cellulose material to be dimensionally stabilized, the stabilizing compounds show considerable resistance to removal by water and solvents, and it is believed, therefore, that probably there is some loose form of physico-chemical combination between the cellulose molecule and the stabilizing chemical. The resistance to removal of the stabilizers by water and solvents is quite marked, particularly if the impregnated cellulose products are heated to elevated temperatures, as for instance between 100° C. and 200° C. It is further believed that the fixation of the stabilizing materials in and on the cellulose fiber may be due to the ability of the molecules of the stabilizing materials to react with each other, as well as with the cellulose, whereby polymerization takes place with the formation of long chain molecules of high molecular weight. The presence of free hydroxyl groups in the partial ester and its polymers suggests that, on heating, the partial esters either initially employed to impregnate the fibrous structure or formed in situ if their initial constituents are added to the cellulose, also react with the hydroxyl groups of the cellulose to modify the chemical structure thereof. It is believed that such modification of the cellulose results in increased dimensional stability of the cellulose structural material and also increases its strength and water resistance.

The fixation of the stabilizing compounds in and on the cellulose fibers can be enhanced by employing them in combination with thermosetting resins which in their partially reacted state are soluble in the volatile, hydrophilic solvents for the stabilizers such as water, low molecular weight alcohols and ketones or mixtures thereof. The thermosetting resins, after setting, are believed to cover and protect the stabilizing materials in and on the cellulose fibers from attack by solvents. In this connection, it is further believed that the stabilizing materials penetrate farther into the cellulose fibers than the thermosetting resins thus producing a protective coating of thermosetting resins.

The incorporation of thermosetting resins into the cellulose structure modifies to some extent the effect of the partial esters in such a way that the hardness and water resistance of the resulting cellulose fiber structures impregnated by the stabilizers are increased. The requirement of the properties determined by the ultimate use of the resulting article will guide the selection of the stabilizing material, either separately or jointly with a thermosetting resin.

Suitable thermosetting resins which may be employed in combination with the stabilizing material of the present invention include phenol-formaldehyde, urea-formaldehyde, and melamine-formaldehyde, which are soluble in the volatile, hydrophilic solvents employed. Any other thermosetting resins which in their partially reacted state have the property of being soluble in such solvents may also be employed. The resins become insoluble and infusible upon curing and prevent attack by water or solvents upon the stabilizing materials and reaction products thereof deposited in and on the cellulose fibers. The amount of thermosetting resin may be varied within a considerable range, for example, between 5% and 50% of thermosetting resin in the final cellulose fiber product, based on the dry weight of fiber.

It will be understood that the following examples are given merely as illustrative of the invention and are not to be deemed limitative since there will be many variations of temperature, fibrous product, and composition, and concentration of impregnant suitable for use in obtaining the results of the invention. The principles of the invention are shown in the specific examples relating to dimensional stabilization of cellulose fiber board.

EXAMPLE 1

163 parts of phthalic acid anhydride and 455 parts of nonaethylene glycol were stirred and heated for 25 minutes at a temperature increased continuously from 25 to 130° C. At the latter temperature an exothermic reaction occurred and the temperature rose spontaneously to 140° C., which was maintained until the titration of a sample indicated that the formation of the monoester was completed. The product was a straw-colored viscous liquid soluble in water and methyl, ethyl and isopropyl alcohols.

The glycol dicarboxylic acid monoester thus produced was used, with and without dilution in water, for impregnating cellulose sheets prepared on a cylinder paper machine from unsized newsprint stock and having dimensions of 12" across the fiber direction, 2" in the fiber direction and 0.042" thick. The impregnation of the sheets was carried out by keeping them submerged in the impregnating liquid at room temperature until a control sample showed that the sheets were completely impregnated, when they were dried and heated at 130° C. for 30 minutes. These sheets were measured accurately when dry and also after conditioning at 90% relative humidity at 37.8° C. The results, compared with untreated sheets, were as follows:

| Monoester in impregnating solution, percent | Monoester in sheet, percent | Expansion retained, percent |
|---|---|---|
| 40 | 33 | 12 |
| 20 | 20 | 39 |

Some of the sheets treated with the monoester, in the absence of any solvent, showed no improvement in dimensional stability over the unimpregnated sheets, because of the low penetration into the cellulosic fiber. The rate of penetration of an aqueous solution containing 12.5% monoester was five times faster than that of water and over one hundred times faster than that of undiluted monoester.

A further evaluation showed that unpressed sheets containing 40% urea-formaldehyde resin retained 78% and those containing 20% urea-formaldehyde resin and 20% nonaethylene glycol phthalic acid monoester retained only 39% of expansion occurring between 35% and 90% relative humidity at 38° C. as compared to the expansion of unimpregnated sheets under identical conditions. In addition, the plasticity and strength of sheets containing the monoester were improved.

The water soluble urea-formaldehyde resin employed in the above impregnation was prepared by heating 749 parts of 37% formalin and 0.8 part of phosphoric acid at 76° C. The liquid was stirred and 240 parts of urea were introduced in small portions within 20 minutes. During the addition of urea and for 10 minutes thereafter, the temperature was kept at 78–80° C., after which the solution was cooled rapidly to room temperature and neutralized with an aqueous 10% sodium hydroxide solution to a pH of 7. 84 parts of urea were then added and stirred until a clear solution was obtained. The aqueous solution of the resin was allowed to stand for 24 hours at room temperature and was diluted with water and its pH adjusted to 5 before impregnating the sheets.

EXAMPLE 2

150 parts of triethylene glycol and 160 parts of carbic anhydride were heated with stirring to 130° C. and after maintaining this temperature for 3 minutes, an exothermic reaction occurred, when a titrometric test on a sample showed that the formation of the monoester was completed. The product was a pale yellow viscous liquid insoluble in water, but soluble in methyl, ethyl and isopropyl alcohols.

Sheets impregnated with 25 and 50% alcoholic solutions of this monoester at room temperature contained, after drying, 23 and 39% of the monoester, respectively. The dimensional stability of the sheets impregnated with the monoester was improved by 74 and 89%, respectively, as determined by measuring the expansion of sheets across the grain, from completely dry state to that acquired by conditioning at 90% relative humidity and 38° C.

The evaluation of unpressed sheets containing 37% of impregnated solids composed of equal parts of the above monoester and the cresol-formaldehyde resin hereafter described, showed that 35% of the expansion of unimpregnated sheets had been retained when tested from completely dry state to that acquired by conditioning at 90% relative humidity and 38° C. The modulus of rupture of sheets having a content of the above resin and monoester totalling 37% impregnating solids in the sheet was 4600. Unpressed sheets containing 38% of the resin without the monoester, under identical conditions, retained 49% of the original expansion and their modulus of rupture averaged 3300.

The above monoester and resin solution was prepared by mixing 177 parts of cresol-formaldehyde resin solution containing 65% solids with 80 parts of triethylene glycol carbic acid monoester and 63 parts of 99% isopropanol. The pH of the solution was 4.0.

The resin employed was prepared by stirring and heating to 50° C., within 10 minutes, 621 parts of 97% cresylic acid, 1093 parts of 37% formaldehyde solution and 68 parts of 10% sodium hydroxide aqueous solution. The ensuing exothermic reaction caused the temperature to rise to 88° C. without external heating and subsided in 35 minutes after which a temperature of 88° was maintained for an additional 10 minutes. The mixture was then cooled, acidified with 50% phosphoric acid and washed with water by decantation. The product contained 65% solids and had a pH of 3.7. Its ethyl alcohol solution containing 45% solids had a viscosity of 127 centipoises at 26° C.

EXAMPLE 3

62 parts of ethylene glycol and 202 parts of sebacic acid were stirred and heated at 155° C. for 30 minutes, after which the titration of a sample indicated that the formation of the monoester was completed. The product was a wax-like material insoluble in water but soluble in methyl, ethyl and isopropyl alcohols and in warm mixtures of any of these alcohols containing a small amount of water.

The impregnating solution was prepared by dissolving 100 parts of the glycol sebacic acid monoester in 200 parts of ethyl alcohol and the solution was kept at 50° C. during the impregnation of the sheets by immersion therein. The sheets, after drying, contained 35% of glycol dicarboxylic acid monoester. Similar testing showed that substantially all of the contraction and expansion due to variations in atmospheric humidity were removed.

As a further test, a laminated board was prepared from three cylinder machine sheets made from unsized newsprint stock, impregnated by immersion in a solution composed of 25% ethylene glycol sebacic acid monoester in ethyl alcohol at 30° C. The excess solution was removed by passage through squeeze rolls and each contained 22% of ethylene glycol sebacic acid monoester. After evaporation of solvents, the sheets were laminated together with bis-phenol-formaldehyde resin and passed between hot rolls under a few pounds of pressure per inch of nip to prevent delamination of the plies during curing. The board was found to contact freely with the rolls without sticking. An increase in the thickness of the sheets indicated swelling of the cellulosic fibers. The board thus prepared had only one-fifth of the expansion and contraction of that of an unimpregnated sheet.

EXAMPLE 4

302 parts of resin and 53 parts of diethylene glycol were heated at 135° C. until the resin melted. The heating was then continued with stirring for 4 hours at 190–210° C., after which the titrometric test indicated approximately one-half the original acidity had been consumed in the formation of the ester. The product was an amber colored resinous material insoluble in water, but soluble in methyl, ethyl, and isopropyl alcohols. The above resin is a polymerized wood resin, containing 40% dimer abietic acid, 50% resin acids and 10% neutral bodies, with a melting point, by the drop method, ranging from 98 to 103° C.

Three ply, parallel laminated panels were prepared, by impregnating cellulosic fiber sheets with a solution composed of 500 parts of cresol-formaldehyde resin, prepared as described in Example 2, 225 parts of the diethylene glycol dimer abietic acid monoester described in the present example, and 175 parts of 99% isopropanol. The pH of the solution was 4.5. The plies were laminated by resorcinol-formaldehyde resin and testing, as described above, showed that the unpressed impregnated board had only one-fourth of the expansion of the original individual plies. A further improvement in dimensional stability was obtained by heating the laminated plies under pressure.

EXAMPLE 5

52 parts of malonic acid and 75 parts of triethylene glycol were heated at 125–130° C. for a period of 35 minutes, at which time the titration of a sample indicated that the formation of the monoester was completed.

The evaluation of the stabilizing effect of this monoester showed that 93% of expansion was removed in cellulosic fiber sheets impregnated with 50% alcoholic solution of the monoester and containing 33% of the monoester.

EXAMPLE 6

76 parts of propylene glycol and 202 parts of sebacic acid were heated at 130° C. and the mixture became clear. The heating was continued with agitation at a temperature increased continuously to a maximum of 160 C. within a period of one hour, when the titration of a sample indicated that the formation of the ester was completed. This wax-like material was insoluble in water, but had limited solubility in ethyl alcohol at room temperature and was easily soluble in the same alcohol at 50° C.

The tests showed 95% and 96% of contraction and expansion was removed in impregnated fiber sheets containing 41% and 21% of the monoester, respectively, measurements being made across the grain, on dry samples and on those conditioned at 75% relative humidity.

EXAMPLE 7

450 parts triethylene glycol and 436 parts of phthalic acid anhydride were heated with stirring at 140° C. within 20 minutes. This temperature was maintained for 8 minutes when titration of the sample indicated that the formation of the monoester was completed. The product was soluble in ethyl alcohol and in a mixture composed of equal parts of water and ethyl alcohol. The tests showed that 81% of contraction and expansion was removed in fiber sheets containing 26% of the monoester.

EXAMPLE 8

228.3 grams of propylene glycol and 576.3 grams of citric acid were heated at a temperature ranging from 130–135° C. for about 50 minutes—taking samples at frequent intervals and until the titration indicated that the formation of the monoester was completed. The product was a colorless viscous liquid soluble in water. Fiber sheets impregnated with a 25% alcoholic solution of this product and heated at 130° C. for 30 minutes were found to contain 29% of the ester and showed, on testing, that 48% of the expansion was removed. Fiber sheets impregnated with a 50% solution similarly heated were found to contain 49% of the ester and showed, on testing, that 60% of the expansion was removed, as compared in each instance to the same sheets without treatment.

EXAMPLE 9

53 parts of diethylene glycol (0.5 mol) and 87 parts of aconitic acid (0.5 mol) were stirred and heated to 135° C. This temperature was maintained for 20 minutes. At the end of this time a sample withdrawn from the reaction mixture was titrated against a standard alkali solution. The tests showed that one-third of the original acidity required for the monoester formation was consumed in the reaction. On cooling the product was a free flowing viscous straw-colored liquid easily soluble in water.

An impregnating solution containing 50% of the monoester described above was prepared by dissolving 50 parts of the monoester in 50 parts of water. A complete impregnation of newsprint strip of board measuring 0.05'' x 2.5'' x 12'' with the largest dimension cut perpendicular to the predominating direction of fibers was accomplished by immersing the strip for 4 minutes beneath the surface of impregnating solution kept at 26° C.

The impregnated strip contained 50% by weight of the monoester. The evaluation tests showed that 95% of the original contraction and expansion was removed in the impregnated sheet and that its water-resistance was four times better than that of the unimpregnated sheet.

In another experiment a strip impregnated with a more dilute solution (25%) contained 28% of the monoester. Its evaluation showed that 67% of its original expansion and contraction was removed. Fiber boards also were impregnated with aqueous solutions containing the monoester described in this example plus one of the thermosetting resins, such as phenol-, urea-, and melamine-formaldehyde resins. All boards so treated showed improved dimensional stability. A further improvement in dimensional stability of these boards was obtained by heating and pressing the boards between platens.

EXAMPLE 10

106 parts of diethylene glycol (1 mol) and 87 parts aconitic acid (0.5 mol) were stirred and heated to 135° C. This temperature was maintained until titrometric determination showed that one-third of the original acidity required for the monoester formation was consumed in the reaction, leaving at least one-half of the original quantity of diethylene glycol unreacted.

Fiber board strips containing 27% and 47% of this product lost 92% and 94%, respectively, of their original properties to contract and expand with variation of relative humidity in the atmosphere.

EXAMPLE 11

106 parts of diethylene glycol (1 mol) and 87 parts of aconitic acid (0.5 mol) were stirred and heated at a constantly rising temperature to 175° C. within 1 hour and 30 minutes. The titration of a sample at the end of this time interval indicated that two-thirds of the original acidity was consumed in the formation of the diester. The contraction and expansion of the treated fiber board strips containing 16% and 35% of the diester described in the example was removed by 46% and 65%, respectively.

EXAMPLE 12

300 parts of polyethylene glycol having an average molecular weight of 600 (½ mol) and 96 parts of citric acid (½ mol) were heated and stirred at 130° C. for a period of 12 minutes, at which time titration of a sample indicated that the formation of the monoester was completed. The product was a viscous liquid freely soluble in water.

Fiber boards strips containing 29% and 47% of the monoester lost 72% and 80%, respectively, of their ability to contract and expand due to humidity variation in the atmosphere.

A fiber board impregnated with a solution composed of 25 parts of the above polyethylene glycol 600 citric acid monoester, 37.5 parts of cresol-formaldehyde resin, 40 parts isopropanol and 147 parts of water contained 20% solid impregnants. The evaluation of this strip showed that 63% of the original contraction and expansion was removed.

The cresol-formaldehyde resin employed above was prepared by heating 222.6 parts of 97% cresylic acid and 292 parts of 37% formaldehyde in the presence of a basic catalyst to 95° C. in 14 minutes, cooling the reacted mixture to room temperature, allowing to stand until two distinct layers were formed, separating the resin layer from the aqueous layer and adjusting the pH of the resin layer to 3.4 just prior to mixing it with the ester.

EXAMPLE 13

100 parts of tetraethylene glycol (0.5 mol) and 144 parts of polycarboxylic aromatic acid (0.5 mol) were heated for one hour at 130° C. and until the titration of the sample indicated that the required amount of the original acidity was consumed in the formation of the monoester. The product was a semi-solid resin-like product easily soluble in ethyl alcohol.

The polycarboxylic aromatic acid herein employed was prepared according to the supplier's information by the controlled oxidation of bituminous coal with gaseous oxygen. The approximate average molecular weight of this acid was 287 and it contained on the average 3.4 carboxyls per molecule of the acid.

The evaluation tests showed that 42% and 56% of the shrinkage and swelling occurring with changes of humidity were removed when a fiber board contained 19% and 36% of the ester, respectively.

It was also found that improved dimensional stability was obtained when part of the ester in the impregnating solution was replaced by a thermosetting resin.

EXAMPLE 14

152 parts of propylene glycol (2 mols) and 174 parts of aconitic acid (1 mol) were heated with stirring at 150° C. for 1 hour and 30 minutes. At the end of this time interval the titration of a sample indicated that ⅔ of the original acidity was consumed in the formation of the diester. The product was an amber colored viscous liquid soluble in water and alcohol.

Fiber board strips impregnated with a solution composed of 50 parts of the diester described in this example, 50 parts of monoester described in Example 12 and 100 parts of water contained 45% of mixed esters in the board. After heating the impregnated board for 15 minutes at 130° C. it lost 92% of its contraction and expansion properties.

An equally good improvement in dimensional stability of the board was obtained when the monoester of Example 12 in the impregnating solution was replaced by diethylene glycol sebacic acid monoester and the water serving as a solvent was replaced by ethyl alcohol.

EXAMPLE 15

118 parts of 2-methyl-1,3-pentanediol (1 mol) and 192 parts of anhydrous citric acid (1 mol) were reacted at 145° C. for 1 hour. The titration of a sample at the end of this time interval indicated that ⅓ of the carboxyl groups present in the original mixture were esterified. The product was substantially 2-methyl-1,3-pentanediol citric acid monoester.

Fiber board strip impregnated with a 25% solution of the above ester is isopropanol contained after drying and heating 20% of the monoesters and showed a reduction in contraction and expansion by 32%.

Fiber board strip containing 13% of 2-methyl-1,3-pentanediol and 13% of cresol-formaldehyde resin lost 42% of its ability to contract and expand with variation of humidity in surrounding atmosphere.

EXAMPLE 16

192 parts of anhydrous citric acid (1 mol) and 192 parts of glycerol (2 mols) were stirred and heated at 135° C. for 27 minutes, at which time the titrometric determination indicated that the required consumption of acidity for formation of the diester took place. The product was a pale amber colored liquid easily soluble in water and ethyl alcohol in all proportions.

Fiber board strips impregnated with the above diester alone and in combination with water-soluble thermosetting resins such as phenol-formaldehyde, urea-formaldehyde and melamine-formaldehyde followed by subsequent heat treatment showed improved dimensional stability in an atmosphere of varying humidity.

EXAMPLE 17

182.2 parts of mannitol (1 mol) with a melting point of 166–166.5° C. and 174 parts of aconitic acid (1 mol) were heated to 138° C. This temperature was maintained while stirring the reacting mixture for 18 minutes. At the end of this time the test of a sample indicated the total number of carboxyl groups was reduced by one-third. The product was substantially mannitol aconitic acid monoester, which was a pale yellow liquid soluble in ethyl alcohol at room temperature and in water at a temperature of approximately 80° C.

Fiber boards containing 26% and 51% of the above ester lost 45% and 75%, respectively, of their properties to contract and expand with changes in humidity. Improved dimensional stability of boards was also obtained when the monoester described in this example was used in conjunction with thermosetting resins soluble in water, alcohol, or a mixture thereof. A further improvement in stability was obtained when samples of the board containing the ester and the thermosetting resin were subjected to pressure during their heat treatment.

EXAMPLE 18

182.2 parts of sorbitol (1 mol) and 192 parts of anhydrous citric acid (1 mol) were heated with stirring at 135° C. for 24 minutes. At the end of this heating period the titration of a sample showed that one-third of the carboxyl groups originally present were reacted. The product was substantially sorbitol citric acid monoester. It was a lemon-colored viscous liquid soluble in alcohol and water. 45% and 78% of contraction and expansion was removed in impregnated boards containing 24% and 47%, respectively, of the ester described in this example.

The boards also showed improvement in dimensional stability and further improvement in water-resistance when part of the ester in the board was replaced by a thermosetting resin. Still further improvement in dimensional stability was obtained when the board containing the monoester and a thermosetting resin was subjected to heat and pressure treatments during curing of the resin.

EXAMPLE 19

200 parts of nonaethylene glycol (0.5 mol) and 72 parts of polycarboxylic aromatic acid (0.25 mol) described in Example 13 were heated with stirring at 155° C. for 3 hours, and until titration of a sample indicated that a portion of the original acidity required for the monoester formation was consumed in the reaction. The product was a dark amber colored viscous liquid soluble in water, alcohol and a mixture thereof.

Fiber board containing 28% of the ester described in this example lost 50% of its original ability of contracting and expanding with variation of humidity in the atmosphere.

EXAMPLE 20

88.7 parts of sorbitol and 140 parts of the polycarboxylic aromatic acid described in Example 13 were heated with stirring at 135° C. until titration of a sample indicated that a portion of original acidity of the reacting mixture was consumed in a quantity required for the formation of monoester.

The product was a viscous, amber colored, transparent semi-solid material soluble in ethyl alcohol and a mixture of ethyl alcohol and water.

Fiber board sheets impregnated with the ester described in this example and subsequently heated for 10 minutes at 130° C. showed improved dimensional stability and improved water-resistance.

EXAMPLE 21

96 parts of glycerol and 202 parts of sebacic acid were heated gently to 125° C., at which temperature a sufficient quantity of sebacic acid melted to permit starting the agitation. The temperature was raised and kept at 135–145° C. while the mixture was stirred constantly for a period of 1 hour and 30 minutes. A titration of a sample withdrawn at the end of this period indicated that one-half of the original acidity was consumed in the formation of an ester.

The product was a tan, non-transparent solid material soluble in ethanol and isopropanol.

Fiber boards impregnated with solutions of monoester described in this example showed improved dimensional stability with heating of the boards subsequent to impregnation.

EXAMPLE 22

45.5 parts of mannitol and 37 parts of phthalic anhydride were gently heated to 150° C. avoiding local overheating. At this temperature a clear solution was obtained which was heated within 15 minutes to 165° C., at which time titration of a sample indicated that one-half of the carboxyl groups originally present in the reaction mixture reacted to form an ester.

The product was a pale yellow, semi-solid transparent material soluble in hot ethanol, propanol and in their aqueous solutions.

Fiber boards impregnated with the ester described in this example showed dimensional stability.

The following additional examples are for the purpose of illustrating the wide latitude in the addition of the dimentional stabilizing compounds to the fibrous cellulose structural elements since the addition may be made at substantially any point in the manufacture of the element or to the completed element.

EXAMPLE A

Cellulose fiber boards prepared on a cylinder machine from pulp obtained from unsized newsprint stock, were impregnated with nonaethylene glycol phthalic acid monoester, with and without dilution in water. The impregnation of the sheets was carried out by keeping them submerged in the impregnating liquid at room temperature until they were completely impregnated with the impregnating liquid, whereupon they were dried and heated at 130° C. for 30 minutes. The initial test sheets were cut accurately and possessed a dimension of 12 inches across the fiber direction, 2 inches in the fiber direction, and were 0.042 inch thick. These sheets were measured accurately when dried and, after being placed in a humidity chamber, maintained at a constant relative humidity of 90% at a temperature of 37.8° C. The sheets were completely conditioned until no further measurable expansion was obtained by leaving the sheets in the humidified atmosphere for an additional period of time.

The normal expansion of untreated board produced by 90% humidity was also obtained and was compared with the expansion in the treated boards. The decrease in the normal expansion caused by the stabilizing chemicals is expressed as per cent normal expansion eliminated.

| | Monoester in Board, Percent | Percent Normal Expansion Eliminated |
|---|---|---|
| #1 | 33 | 88 |
| #2 | 20 | 61 |

EXAMPLE B

Samples of single ply fiber board were immersed at 50° C. in an ethyl alcohol solution of ethylene glycol sebacic acid monoester. The alcohol solution was prepared by dissolving 100 parts of the ester in 200 parts of the alcohol. The sheets, after drying, contained 35% of the ester and, when tested for dimensional stabilization as outlined in Example A, showed that 95%, that is substantially all, of the normal expansion had been eliminated. 38% removal of expansion was obtained with a board containing 2% of glycol sebacate monoester based on weight of dry fiber.

EXAMPLE C

Impregnation of the cellulose board with a mixture of partial esters is also extremely effective. Thus, board of the type described in Example A was impregnated by immersion in an isopropyl alcohol solution of 50% concentration of ester and containing equal parts of the diethylene glycol phthalic acid ester and ethylene glycol sebacic acid ester. Impregnation of structural cellulose fiber board with a mixture of these esters as dimensional stabilizers produced an excellent stabilizing effect by reducing the normal expansion by 12% and 90% when the boards contained 1% and 33½% of the above monoesters, respectively, based on the dry weight of board.

Where impregnation of the fibers is attempted prior to the preparation of a fiber board, economic and operational restrictions will narrow the selection of partial esters employed under such circumstances to those which are soluble in water, or to the employment of solutions of the constituents of such esters, also soluble in water. Comminuted cellulose fibers can be impregnated, however, with the stabilizing chemicals dissolved in organic solvents and structural members made therefrom show excellent dimensional stability under extremes of humidity conditions. This is shown in the following example:

EXAMPLE D

An aqueous pulp suspension of a consistency of 1% was prepared containing 25% concentration of diethylene glycol phthalic acid monoester based on solution. Sheets of fiber board were prepared from this pulp, cut to size and the expansion determined by increasing the humidity from 0% to 90%. When this expansion was compared with that of board made from another portion of the same pulp without the presence of the stabilizer, it was found that a 10.3% content of the ester in the board, based on the weight of dry fiber, eliminated 35% of the normal expansion.

The same type of results was obtained when applying a solution of the stabilizing chemicals to the wet end of the paper making machine. This operation gives somewhat greater flexibility in the choice of stabilizing compound to be employed, as compared with addition to the beater or head chest, for example, since it is entirely practicable to use organic solvent solutions of the stabilizer, for instance, a solution made of equal parts water and isopropyl alcohol and containing 50% concentration of a mixture of the monoesters of citric acid and triethylene glycol and of mannitol and maleic acid. When applying such a solution to the wet lap in amounts to provide about 18% to 20% content of monoesters in the board on a dry fiber basis, reductions in the normal expansion on the order of 50 to 55% were obtained. At lower dilutions, good results were also obtained but, in many instances, operating technique will dictate the employment of relatively concentrated solutions when application is made to the wet lap.

Laminated cellulose structural fiber board may be impregnated with the dimensional stabilizer in any suitable fashion although immersion in the dimensional stabilizer or a solution thereof is recommended. In general, the temperature of the liquid in which the laminated cellulose structural fiber board is immersed will be room temperature. Where a laminated product of an exceptionally high caliper is to be impregnated, the temperature of the liquid may be elevated to facilitate penetration. The laminated board may be soaked in the impregnating solution until such time as the desired quantity of dimensional stabilizer has been absorbed by or combined in some physico-chemical manner with the cellulose.

It may be found expedient when treating laminated cellulose structural fiber boards, or other cellulose elements which are relatively rigid, to pack the same in a chamber, preferably in an upright position, having the boards spaced slightly apart to facilitate free circulation. It will also be found expedient to subject the chamber to vacuum whereby gases and other volatile materials, which interfere with free penetration of the solution into the board, are removed. Liquid containing the dimensional stabilizer is then admitted to the evacuated chamber containing the cellulose material and penetration throughout the body of the cellulose elements is facilitated. The impregnated boards are then removed from the solution and passed through any conventional form of drier.

The preferred material for impregnating articles made of cellulose fibers in accordance with the present invention is a monoester of a polyalkylene glycol and a dicarboxylic acid having the general formula:

HOCRR(CRROCRR)xCRROR'COOH where R in each insaance may be either a hydrogen atom or an alkyl group and R' is a monoacyl radical derived from a dicarboxylic acid and X is a whole number below about 150.

Examples of polyalkylene glycols employed to make the monoesters above referred to are diethylene, dipropylene, dibutylene, triethylene, tetraethylene, hexaethylene, nonaethylene, etc., up to polyalkylene glycols of molecular weights not exceeding approximately 7000.

Examples of dicarboxylic acids employed in making the preferred mono esters are oxalic, succinic, maleic, fumaric, malic, tartaric, adipic, malonic, sebacic, phthalic, methylene disalicyclic, dimer abietic, dimer linoleic and dimer linolenic.

The above acids include both aliphatic and aromatic acids and also include hydroxy acids containing hydroxyl groups in addition to carboxyl groups. It will be apparent that the anhydrides of such acids as form anhydrides, for example, phthalic, maleic, succinic and carbic anhydrides, may be employed (carbic anhydride is 3,6 endomethylene-tetrahydrophthalic anhydride, having a melting point of 161 to 163.5° C.).

Instead of the polyalkylene glycols, the simple glycols may be employed with any of the above listed acids to produce glycol dicarboxylic acid monoesters of the general formula:

HOCRRCRROR'COOH where R in each instance may be either a hydrogen atom or an alkyl group and R' is a monoacyl radical derived from a dicarboxylic acid. It is evident that the first formula given above includes the second formula if X also has the value of zero. Examples of simple glycols which may be employed to produce monoesters are ethylene, propylene, butylene, hexylene, etc. Such simple glycols may be employed with any of the dicarboxylic acids also listed above.

Although the glycols, and particularly the polyalkylene glycols, are preferred, other polyhydric alcohols having two or more hydroxyl groups may be employed, examples of such alcohols being 2-methyl-1,3-pentanediol, 1,10 decanediol, glycerol, glucose, mannitol and sorbitol. That is to say, the polyhydric alcohols contemplated by the present invention may be characterized as being aliphatic polyhydric alcohols containing from two to six hydroxyl groups. Any of such polyhydric alcohols may be employed with any of the polyhydric acids above listed.

Although the dicarboxylic acids are also preferred, in making the partial esters of the present invention, polycarboxylic acids having more than two carboxyl groups may be employed, for example, aconitic, citric, polycarboxylic aromatic acids prepared by the controlled oxidation of bituminous coal with gaseous oxygen, etc. That is to say, the polycarboxylic acids contemplated by the present invention may be characterized as being dicarboxylic and tricarboxylic acids. Again, any of these polycarboxylic acids may be employed with any of the polyhydric alcohols above listed, including the simple glycols, the polyalkylene glycols and other polyhydric alcohols having two or more hydroxyl groups.

When dihydric alcohols and dicarboxylic acids are employed, they will ordinarily be reacted together in substantially equimolecular proportions and the reaction carried on until approximately one-half of the hydroxyl groups of the dihydric alcohols have been reacted with one-half of the carboxyl groups of the dicarboxylic acids as determined by the reduction in the original acid number in the mixture to approximately one-half. It will be apparent that a pure monoester of the glycol and dicarboxylic acid will not ordinarily be obtained but that there will usually be small quantities of unreacted dicarboxylic acids and unreacted dihydric alcohols and also a small quantity of diesters and polymerized monoesters present. The effect of the small quantities of diesters and polymerized monoesters on the stabilizing properties of the monoester is negligible for practical purposes and, consequently, can be disregarded. However, larger quantities of such by-products produced by over-reaction of the reaction mixture will usually have a pronounced adverse effect on the stabilizing properties of the monoester. If, for example, the monoester is allowed to continue to react to such an extent that about 75% or more of the original acidity of the dicarboxylic acid is removed, i. e., more than 25% diester is produced, then the resulting ester loses a very large portion of its stabilizing properties. It will be noted that in the monoester mentioned herein there is one free hydroxyl group on each residue of the polyhydric alcohol in the molecule of the resulting partial ester and that there is one free carboxyl group on each residue of the polycarboxylic acid.

When the polyhydric alcohol contains more than two hydroxyl groups, or the carboxylic acid contains more than two carboxyl groups or when both reactants have more than two reactive groups, the same general rule holds true. There should be at least one unreacted or free hydroxyl group on the residue of the polyhydric alcohol and at least one unreacted or free carboxyl group on the residue of the polycarboxylic acid in the molecule of the resulting partial ester. It will be apparent that with polyhydric alcohols having more than two hydroxyl groups, the resulting partial ester may contain two or more hydroxyl groups on the residue of the polyhydric alcohol, and similarly, with polycarboxylic acids having more than two carboxyl groups there may be two or more carboxyl groups on the residue of the carboxylic acid.

Another important physical characteristic of the stabilizing material is that it be substantially non-volatile under all temperature conditions likely to be encountered. That is to say, it should have a boiling point at least as high as 150° C. and preferably substantially higher at atmospheric pressure.

As to the solvents which may be employed for making up an impregnating solution, water is the preferred solvent and will ordinarily be employed alone if the stabilizing material is soluble therein in all proportions. If necessary to obtain solution of the stabilizing material, volatile water-miscible organic solvents such as aliphatic alcohols containing three carbons or less, that is, from one to three carbons or aliphatic ketones containing five carbons or less, that is, from three to five carbons may be employed either alone or in admixture with each other or with water. By way of example, methyl, ethyl and propyl alcohols are particularly suitable and dimethyl, diethyl methyl ethyl, methyl propyl or ethyl propyl ketones are also suitable. Such solvents or solvent mixtures should have a boiling point substantially below that of the stabilizing mixture, i. e., a boiling point not above approximately 105° C. at atmospheric pressure. Such solvents may be termed volatile hydrophilic solvents and for purposes of this application, the term "volatile hydrophilic solvent" is defined as water, a water-miscible organic solvent or mixtures thereof having a boiling point not greater than 105° C.

The solution employed to impregnate the fibrous material may have a concentration between approximately 2% and 50% by weight when the partial ester is employed alone or may have a concentration between approximately 5% and 60% by weight when a mixture of the partial ester and a thermosetting resin is employed. In the solution of the partial ester alone, it will be apparent that the amount of solvent is between approximately 50% and 98%, and in the solution of the mixture, the amount of solvent is between approximately 40% and 95%. Where the mixture is employed, the amount of thermosetting resin may be between approximately 5% and 50% by weight of the mixture. In the final product the amount of either the partial ester alone or the mixture of partial ester and thermosetting resin may be between approximately 2% and 50% by weight of the fibrous material; and where a mixture is employed, the amount of thermosetting resin in the final product may be between approximately 2% and 50% by weight of the mixture.

The present application is a continuation-in-part of my copending application Serial No. 627,966 filed November 10, 1945, now abandoned.

As disclosed in said application Serial No. 627,966, the composition for impregnating the fibrous material consisting predominantly of cellulose fibers may comprise a solvent solution containing from about 2% to about 30% by weight of a thermosetting resin soluble in the solvent and from about 2% to about 30% by weight of substantially monoester of a glycol and a dicarboxylic acid in which the molecules of the monoester have an unreacted hydroxyl group and an unreacted carboxyl group and the solvent may be either water, methyl alcohol, ethyl alcohol, isopropyl alcohol or mixtures of such solvents. In carrying out the method of impregnating such fibrous material the solvent solution may be that just described or may be a solution containing from about 10% to about 60% by weight of the monoester alone such that the amount of solvent in the solution may range from about 40% to 90%. The resulting product may be impregnated substantially throughout the fibrous material with the thermosetting resin when this material is employed in conjunction with the monoester and in any event the resulting product may be impregnated and reacted substantially throughout the fibrous material with the substantially monoester, the amount of the monoester in the fibrous material being in the range of from 5% to 50%.

What is claimed is:

1. A composition for impregnating a fibrous material consisting predominantly of cellulose fibers, which composition comprises, a solvent solution containing between approximately 5% and 60% by weight of a mixture of a thermosetting resin soluble in said solvent and substantially monoester of a glycol and a dicarboxylic acid in which the molecules of the monoester have the following formula:

$$HOCRR(CRROCRR)_xCRROR'COOH$$

wherein R is selected from the group consisting of hydrogen and an alkyl group, R' is a monoacyl radical derived from a dicarboxylic acid and X is a whole number below 150, the amount of said thermosetting resin in said mixture being between approximately 5% and 50% by weight of said mixture, said solvent being selected from the group consisting of water, aliphatic alcohols having from one to three carbon atoms and ketones having from three to five carbon atoms.

2. A composition for impregnating a fibrous material consisting predominantly of cellulose fibers, which composition comprises, a solvent solution containing between approximately 5% and 60% by weight of a mixture of a thermosetting resin soluble in said solvent and a substantially monoester of a glycol and a dicarboxylic acid in which the molecules of the monoester have the following formula:

$$HOCRRCRROR'COOH$$

wherein R is selected from the group consisting of hydrogen and an alkyl group, and R' is a monoacyl radical derived from a dicarboxylic acid, the amount of said thermosetting resin in said mixture being between approximately 5% and 50% by weight of said mixture, said solvent being selected from the group consisting of water, aliphatic alcohols having from one to three carbon atoms and ketones having from three to five carbon atoms.

3. An an article of manufacture, a board of fibrous material having improved dimensional stability and consisting predominantly of felted cellulose pulp fibers impregnated and reacted substantially throughout said fibrous material with a partial ester of an aliphatic polyhydric alcohol containing from two to six hydroxyl groups each of which is attached to a different carbon atom and a polycarboxylic acid containing not more than 3 carboxyl groups in which the molecules of the partial ester before reaction with said cellulose fibers are essentially in monomeric form and have in each alcohol residue a free hydroxyl group and in each acid residue a free carboxyl group, the amount of said partial ester in said fibrous material being between approximately 2% and 50% by weight of said fibrous material.

4. As an article of manufacture, a board of fibrous material having improved dimensional stability and consisting predominantly of felted cellulose pulp fibers impregnated and reacted substantially throughout said fibrous material with a substantially monoester of a glycol and a dicarboxylic acid in which the molecules of said monoester before reaction with said cellulose fibers have the following formula:

HOCRR(CRROCRR)xCRROR'COOH wherein R is selected from the group consisting of hydrogen and an alkyl group, R' is a monoacyl radical derived from a carboxylic acid and X is a whole number below 150, the amount of said monoester in said fibrous material being between approximately 2% and 50% by weight of said fibrous material.

5. As an article of manufacture, a board of fibrous material having improved dimensional stability and consisting predominantly of felted cellulose pulp fibers impregnated and reacted substantially throughout said fibrous material with substantially monoester of a glycol and a dicarboxylic acid in which the molecules of said monoester before reaction with said cellulose fibers have the following formula:

HOCRRCRROR'COOH wherein R is selected from the group consisting of hydrogen and an alkyl group, and R' is a monoacyl radical derived from a dicarboxylic acid, the amount of said monoester in said fibrous material being between approximately 2% and 50% by weight of said fibrous material.

6. As an article of manufacture, a board of fibrous material having improved dimensional stability and consisting predominantly of felted cellulose pulp fibers impregnated with a heat set thermosetting resin substantially throughout said fibrous material and also impregnated and reacted substantially throughout said fibrous material with a partial ester of an aliphatic polyhydric alcohol containing from two to six hydroxyl groups each of which is attached to a carbon atom and a polycarboxylic acid containing not more than 3 carboxyl groups in which the molecules of the partial ester before reaction with said cellulose fibers are essentially in monomeric form and have in each alcohol residue a free hydroxyl group and in each acid residue a free carboxyl group, the total amount of the resulting mixture of said thermosetting resin and said partial ester in said fibrous material being between approximately 2% and 50% by weight and the amount of said thermosetting resin being between approximately 2% and 50% by weight of said mixture.

7. As an article of manufacture, a board of fibrous material having improved dimensional stability and consisting predominantly of felted cellulose pulp fibers impregnated with a heat set thermosetting resin substantially throughout said fibrous material and also impregnated and reacted substantially throughout said fibrous material with substantially monoester of a glycol and a dicarboxylic acid in which the molecules of the monoester before reaction with said cellulose fibers have the following formula:

HOCRR(CRROCRR)xCRROR'COOH wherein R is selected from the group consisting of hydrogen and an alkyl group, and R' is a monacyl radical derived from a dicarboxylic acid and X is a whole number below 150, the total amount of the resulting mixture of said thermosetting resin and said monoester in said fibrous material being between approximately 2% and 50% by weight of said fibrous material and the amount of said thermosetting resin in said mixture being between approximately 2% and 50% by weight of said mixture.

8. As an article of manufacture, a board of fibrous material having an improved dimensional stability and consisting predominantly of felted cellulose pulp fibers impregnated with a heat set thermosetting resin substantially throughout said fibrous material and also impregnated and reacted substantially throughout said fibrous material with substantially monoester of a glycol and a dicarboxylic acid in which the molecules of the monoester before reaction with said cellulose fibers have the following formula:

HOCRRCRROR'COOH wherein R is selected from the group consisting of hydrogen and an alkyl group, and R' is a monoacyl radical derived from a dicarboxylic acid, the total amount of the resulting mixture of said thermosetting resin and said monoester in said fibrous material being between approximately 2% and 50% by weight of said mixture.

9. The method of dimensionally stabilizing a board of fibrous material consisting predominantly of felted cellulose pulp fibers, which comprises, impregnating said fibrous material substantially throughout said fibrous material with a solvent solution containing between approximately 2% and 50% by weight of a partial ester essentially in monomeric form of an aliphatic polyhydric alcohol containing from two to six hydroxyl groups each of which is attached to a different carbon atom and a polycarboxylic acid containing not more than 3 carboxyl groups in which the molecules of the partial ester have in each alcohol residue a free hydroxyl group and in each acid residue a free carboxyl group, and between approximately 50% and 98% by weight of a solvent selected from the group consisting of water, aliphatic alcohols containing from one to three carbon atoms and ketones containing from three to five carbon atoms and drying the resulting board.

10. The method of dimensionally stabilizing a board of fibrous material consisting predominantly of felted cellulose pulp fibers, which comprises, impregnating said fibrous material substantially throughout said fibrous material with a solvent solution containing between approximately 2% and 50% by weight of substantially monoester of a glycol and a dicarboxylic acid in which the molecules of the monoester have the following formula:

HOCRR(CRROCRR)xCRROR'COOH wherein R is selected from the group consisting of hydrogen and an alkyl group, R' is a monoacyl radical derived from a dicarboxylic acid and X is a whole number below 150, and between approximately 50% and 98% of a solvent selected from the group consisting of water, aliphatic alcohols having from one to three carbon atoms and ketones having from three to five carbon atoms and drying the resulting board.

11. The method of dimensionally stabilizing a board of fibrous material consisting predominantly of felted cellulose pulp fibers, which comprises, impregnating said fibrous material substantially throughout said fibrous material with a solvent solution containing between approximately 2% and 50% by weight of substantially monoester of a glycol and a dicarboxylic acid in which the molecules of the monoester have the following formula:

HOCRRCRROR'COOH wherein R is selected from the group consisting of hydrogen and an alkyl group, and R' is a monoacyl radical derived from a dicarboxylic acid, and between approximately 50% and 98% of a solvent selected from the group consisting of water, aliphatic alcohols having from one to three carbon atoms and ketones having from three to five carbon atoms and drying the resulting board.

12. The method of dimensionally stabilizing a board of fibrous material consisting predominantly of felted cellulose pulp fibers, which comprises, impregnating said fibrous material substantially throughout said fibrous material with a solvent solution containing between approximately 5% and 60% by weight of a mixture of a thermosetting resin soluble in said solvent and a partial ester essentially in monomeric form of an aliphatic polyhydric alcohol containing from two to six hydroxyl groups each of which is attached to a different carbon atom and a polycarboxylic acid containing not more than 3 carboxyl groups in which the molecules of said ester have in each alcohol residue a free hydroxyl group and in each acid residue a free carboxyl group, and between approximately 40% and 95% of a volatile hydrophilic solvent selected from the group consisting of water, aliphatic alcohols having from one to three carbon atoms and ketones having from three to five carbon atoms, the amount of said thermosetting resin in said mixture being between approximately 5% and 50% by weight of said mixture and drying and heating the resulting board to set said thermosetting resin.

13. The method of dimensionally stabilizing a board of fibrous material consisting predominantly of felted cellulose pulp fibers, which comprises, impregnating said fibrous material substantially throughout said fibrous material with a solvent solution between approximately 5% and 60% by weight of a mixture of a thermosetting resin soluble in said solvent and substantially monoester of a glycol and a dicarboxylic acid in which the molecules of the monoester have the following formula:

HOCRR(CRROCRR)xCRROR'COOH wherein R is selected from the group consisting of hydrogen and an alkyl group, R' is a monoacyl radical derived from a dicarboxylic acid and X is a whole number below 150, and between approximately 40% and 95% of a solvent selected from the group consisting of water, aliphatic alcohols having from one to three carbon atoms and ketones having from three to five carbon atoms, the amount of said thermosetting resin in said mixture being between approximately 5% and 50% by weight of said mixture and drying and heating the resulting board to set said thermosetting resin.

14. The method of dimensionally stabilizing a board of fibrous material consisting predominantly of felted cellulose pulp fibers, which comprises, impregnating said fibrous material substantially throughout said fibrous material with a solvent solution containing between approximately 5% and 60% by weight of a mixture of a thermosetting resin soluble in said solvent and substantially monoester of a glycol and a dicarboxylic acid in which the molecules of the monoester have the following formula:

HOCRRCRROR'COOH wherein R is selected from the group consisting of hydrogen and an alkyl group, and R' is a monoacyl radical derived from a dicarboxylic acid, and between approximately 40% and 95% of a solvent selected from the group consisting of water, aliphatic alcohols having from one to three carbon atoms and ketones having from three to five carbon atoms, the amount of said thermosetting resin in said mixture being between approximately 5% and 50% by weight of said mixture and drying and heating the resulting board to set said thermosetting resin.

*15. As an article of manufacture, a sheet of cellulose material having improved stability against expansion and contraction with variations in atmospheric humidity and consisting predominantly of cellulose fibers impregnated and reacted substantially throughout said cellulose material with a partial ester of an aliphatic polyhydric alcohol containing from two to six hydroxyl groups each of which is attached to a different carbon atom and a polycarboxylic acid containing not more than three carboxyl groups in which the molecules of the partial ester before reaction with said cellulose are essentially in monomeric form and have in each alcohol residue a free hydroxyl group and in each acid residue a free carboxyl group, the amount of said partial ester in said cellulose material being between approximately 2% and 50% by weight of said cellulose material.*

*16. The method of stabilizing a sheet of cellulose material consisting predominantly of cellulose fibers against expansion and contraction with variations in atmospheric humidity, which comprises, impregnating said cellulose material substantially throughout with a solvent solution containing between approximately 2% and 50% by weight of a partial ester essentially in monomeric form of an aliphatic polyhydric alcohol containing from two to six hydroxyl groups each of which is attached to a different carbon atom and a polycarboxylic acid containing not more than three carboxyl groups in which the molecules of the partial ester have in each alcohol residut a free hydroxyl group and in each acid residue a free carboxyl group and between approximately 50% and 98% by weight of a solvent selected from the group consisting of water, aliphatic alcohols containing from one to three carbon atoms and ketones containing from three to five carbon atoms and drying the resulting material.*

*17. As an article of manufacture, a sheet of cellulose material having improved stability against expansion and contraction with variations in atmospheric humidity and consisting predominantly of cellulose fibers impregnated with a heat set thermosetting resin substantially throughout said cellulose material and also impregnated and reacted substantially throughout said cellulose material with a partial ester of an aliphatic polyhydric alcohol containing from two to six hydroxyl groups each of which is attached*

*to a different carbon atom and a polycarboxylic acid containing not more than three carboxyl groups in which the molecules of the partial ester before reaction with said cellulose fibers are essentially in monomeric form and have in each alcohol residue a free hydroxyl group and in each acid residue a free carboxyl group, the total amount of the resulting mixture of said thermosetting resin and said partial ester in said fibrous material being between approximately 2% and 50% by weight of said fibrous material and the amount of said thermosetting resin being between approximately 2% and 50% by weight of said mixture.*

*18. The method of stabilizing a sheet of cellulose material consisting predominantly of cellulose fibers against expansion and contraction with variations in atmospheric humidity, which comprises, impregnating said cellulose material substantially throughout with a solvent solution containing between approximately 5 and 60% by weight of a mixture of a thermosetting resin soluble in said solvent and a partial ester essentially in monomeric form of an aliphatic polyhydric alcohol containing from two to six hydroxyl groups, each of which is attached to a different*

*carbon atom and a polycarboxylic acid containing not more than three carboxyl groups in which the molecules of the partial ester have in each alcohol residue a free hydroxyl group and in each acid residue a free carboxyl group and between approximately 40% and 95% by weight of a solvent selected from the group consisting of water, aliphatic alcohols having from one to three carbon atoms and ketones having from three to five carbon atoms, the amount of said thermosetting resin in said mixture being between 5% and 50% by weight of said mixture and drying and heating the resulting material to set said thermosetting resin.*

References Cited in the file of this patent or the original patent

UNITED STATES PATENTS

| Number | Name | Date |
|---|---|---|
| 2,073,031 | Sly | Mar. 9, 1937 |
| 2,115,709 | Dreyfus | May 3, 1938 |
| 2,421,291 | Schmutzler | May 27, 1947 |

FOREIGN PATENTS

| Number | Country | Date |
|---|---|---|
| 575,532 | France | Apr. 24, 1924 |